United States Patent [19]
Katai

[11] 3,868,705
[45] Feb. 25, 1975

[54] CONTROL CIRCUIT FOR ELECTRONIC SHUTTER FOR ELECTRONIC SHUTTER HAVING BATTERY-CHECKING CIRCUIT
[75] Inventor: Kiyoshi Katai, Tokyo, Japan
[73] Assignee: Seiko Koki Kabushiki Kaisha
[22] Filed: July 16, 1973
[21] Appl. No.: 379,777

[30] Foreign Application Priority Data
July 14, 1972 Japan................................ 47-82526

[52] U.S. Cl................................. 354/51, 354/60 EI
[51] Int. Cl......................... G03b 17/18, G03b 7/08
[58] Field of Search ........... 95/10 C, 10 CE, 10 CT; 354/51, 60, 60 EI

[56] References Cited
UNITED STATES PATENTS
3,581,634 6/1971 Ort .................................. 95/10 CT
3,631,777 1/1972 Mita ................................ 95/10 CT
3,646,859 3/1972 Umemura ....................... 95/10 CT Primary Examiner—Samuel S. Matthews
Assistant Examiner—Russell E. Adams, Jr.
Attorney, Agent, or Firm—Robert E. Burns; Emmanuel J. Lobato; Bruce L. Adams

[57] ABSTRACT

An exposure control circuit with a battery-checking circuit and light meter built-in. An ammeter in the circuit has a dual scale for reading the light intensity or brightness of the scene or object being photographed. A switch arrangement provides for independently taking an exposure with the exposure time automatically controlled, taking a light meter reading and for checking the adequacy of the battery all with the same control circuit.

2 Claims, 1 Drawing Figure

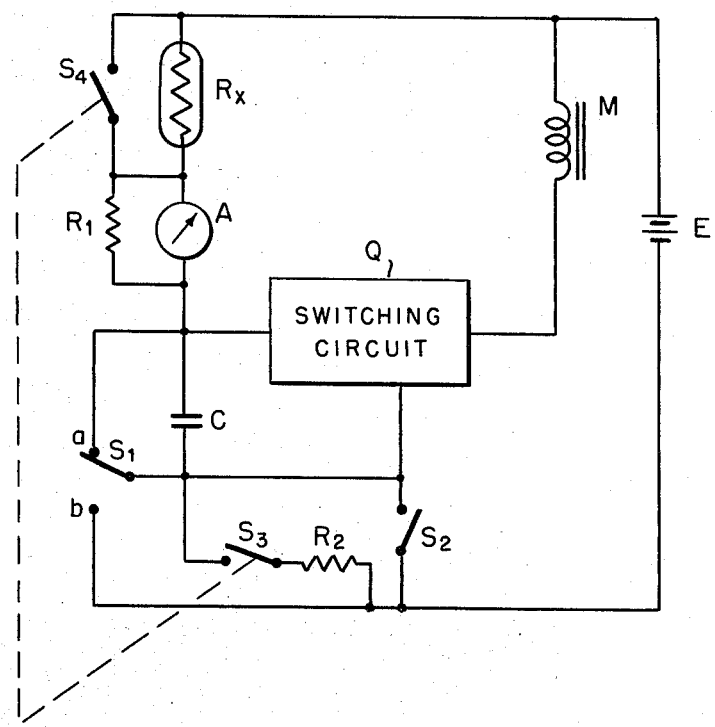

CONTROL CIRCUIT FOR ELECTRONIC SHUTTER FOR ELECTRONIC SHUTTER HAVING BATTERY-CHECKING CIRCUIT

BACKGROUND OF THE INVENTION

This invention relates generally to camera shutters and more particularly to an electronic shutter control circuit.

Control circuits for electronically controlled camera shutters are known. These circuits have independently actuated switches for taking photographic exposures and taking light intensity readings on a light meter. Independent means are provided for checking the battery energizing the circuitry of the camera.

SUMMARY OF THE INVENTION

It is a principal object to provide a new and improved single electronic control circuit for a camera shutter for controlling exposure time when taking photographic exposures, for taking readings of the light intensity of a scene or object to be photographed and for taking a reading of the current available from the camera battery to which the control circuit is connected thereby checking the battery.

The control circuit according to the invention has a photo-sensitive cell that will pass current variably as a function of the intensity of light that it senses. A light-intensity indicating circuit is connected directly to the photo-sensitive cell to form a light meter therewith. A switching circuit closes the shutter under control of an RC delay or time constant circuit formed by a capacitor and the photo-sensitive cell.

The light-intensity indicating circuit comprises an ammeter calibrated with two scales to indicate light readings and current readings of the current available from the battery powering the control circuit. A change-over power switch normally short circuits the capacitor and when actuated in taking an exposure connects the capacitor for charging under control of the cell for controlling the exposure time. A second power switch is connected in series with the capacitor for connecting the power to the cell while the capacitor is short circuited for taking light readings. A separately actuated ganged switch in a battery-checking circuit will short circuit the cell when actuated and apply power to the ammeter from the battery so that the current available from the battery is read out.

BRIEF DESCRIPTION OF THE DRAWING

Other features and advantages of the electronic shutter control circuit with a battery-checking circuit therein in accordance with the present invention will be better understood as described in the following specification and appended claims in conjunction with the accompanying drawing which is a schematic of a control circuit according to the invention.

DESCRIPTION OF THE PREFERRED EMBODIMENT

According to the control circuit embodying the invention a power source or battery E is provided across which is connected a switching circuit Q. On the output side of the switching circuit is connected an electromagnet which is energized when a photo is taken and is de-energized when the photographic exposure is completed. When the camera release button or lever, not shown, is actuated for taking an exposure the shutter, not shown, is opened and the shutter actuating mechanism, not shown, is held maintaining the shutter open since the electromagnet will then be energized as will become apparent.

A delay circuit or time constant circuit constituting a photoconductive cell $R_x$, for example a Cds, and a capacitor C across the power source control the exposure time. The switching circuit Q is activated to close the shutter when a charge in the capacitor reaches a predetermined level. The capacitor is charged under control of the cell $R_x$ which passes current variably in dependence upon the intensity of the light it receives and senses from the scene or object to be photographed.

A light-intensity circuit is directly connected in series with the cell and comprises an ammeter A connected to an output terminal of the photoconductive cell $R_x$. A compensating resistor $R_1$ shunts the ammeter A. The resistance of the ammeter A and the shunt resistor R, is kept at a negligible value relative to the internal resistance of the cell $R_x$ in order to have no effect on the delay time of the delay circuit.

A change-over power switch $S_1$ has a movable contact normally contacting a stationary contact a short circuiting the capacitor C. When an exposure is taken the release button, not shown, actuates the movable contact of the change-over switch $S_1$ to a position in which it contacts a second stationary contact b thereby applying power across the circuit and the capacitor is charged at a rate depending upon the intensity of the light sensed by the photoconductive cell and the exposure time is controlled as before described.

A second power switch $S_2$ is provided. This is normally open and connected as shown in series with the power source. It is actuated independently by a button for taking light meter readings. When it is closed the ammeter will indicate the light value. Since the change-over switch $S_1$ is in the position shown in the drawing the capacitor is short circuited. The second power switch restores itself to an open position when the light reading has been taken for adjusting of the shutter speed.

The same control circuit makes provision for a battery-checking circuit. This latter circuit comprises a pair of ganged switches $S_3$ and $S_4$. A first switch $S_3$ of the two is a third power switch connected to the power source through a protective series resistor $R_2$. It will complete a circuit across the battery when closed since it is connected in series with the delay or time constant circuit and light-intensity indicating circuit as shown. The second of the gauged switches $S_4$ is connected to short circuit the cell when closed and will place the ammeter in circuit with the battery directly, free of the effect of the cell, for taking a reading of the available battery current, i.e., checking the battery. Both ganged switches $S_3$ and $S_4$ are normally open and are actuated separately from the other switches by a separate camera button, not shown.

What I claim and desire to secure by Letters Patent is;

1. An electronic shutter control circuit for a camera shutter electronically controlled comprising, means comprising, a light-responsive element sensing light received from a scene to be photographed for controlling exposure time as a function of the intensity of light received, a switching circuit connected to said means to control the closing of a shutter, a light-intensity indicating circuit having an ammeter for indicating visually the intensity of the light at said scene, a power source for selectively energizing the light-responsive element, a power source checking circuit for checking the current delivered from said power source to determine its adequacy, switch means to independently control exposure time when taking an exposure, taking a light intensity reading on said ammeter and a reading on said ammeter of the current available from said power source, the first-mentioned means including a capacitor connected to said light responsive element defining an RC time constant circuit therewith, for controlling said exposure time, means connecting said ammeter and light-responsive element in series between a terminal of said power source and an input of said switching circuit, and said switch means including a change-over switch normally short-circuiting the capacitor.

2. An electronic shutter control circuit for a camera shutter electronically controlled according to claim 1, in which said switch means comprises means for short circuiting the light-responsive element and for placing the ammeter in circuit with said power source for indicating the current available from the power source.

* * * * *